July 20, 1943.  R. W. ALLEN ET AL  2,325,002
BAND CUTTER
Filed Dec. 11, 1942  4 Sheets-Sheet 2

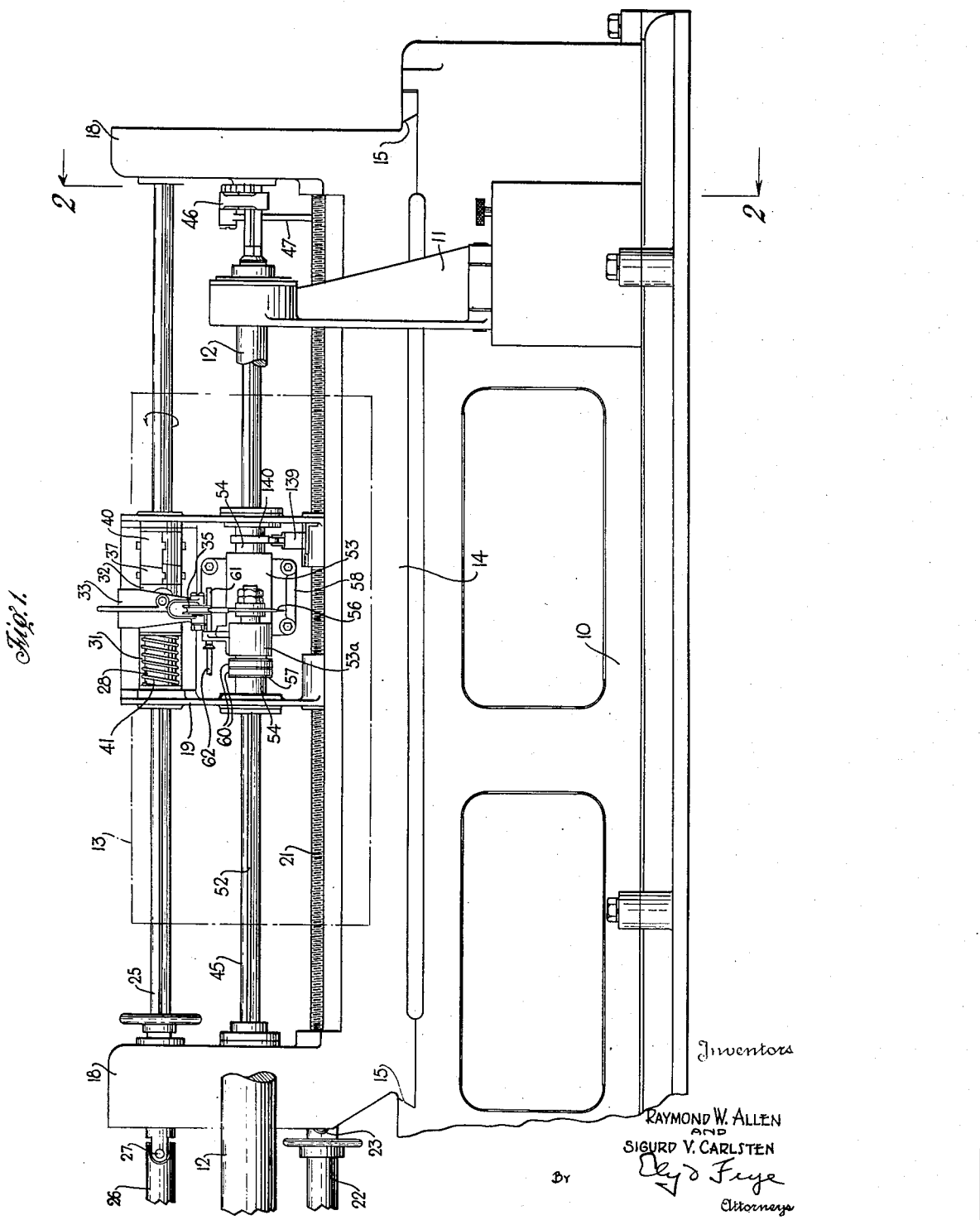

Inventor
RAYMOND W. ALLEN
AND
SIGURD V. CARLSTEN
BY Ely & Frye
Attorneys

July 20, 1943.  R. W. ALLEN ET AL  2,325,002
BAND CUTTER
Filed Dec. 11, 1942  4 Sheets-Sheet 3

Inventors
RAYMOND W. ALLEN
AND
SIGURD V. CARLSTEN
By Ely & Frye
Attorneys

July 20, 1943.  R. W. ALLEN ET AL  2,325,002
BAND CUTTER
Filed Dec. 11, 1942  4 Sheets-Sheet 4
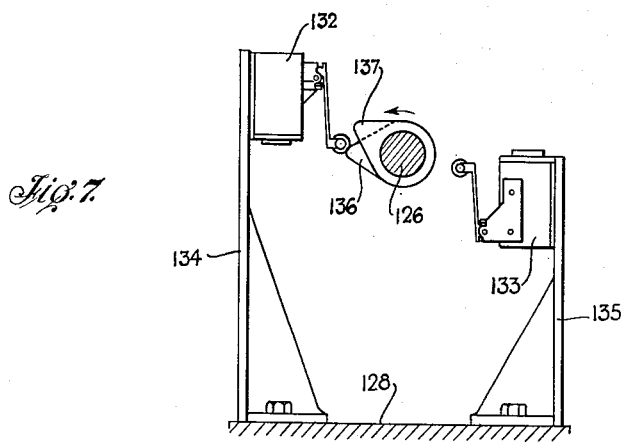
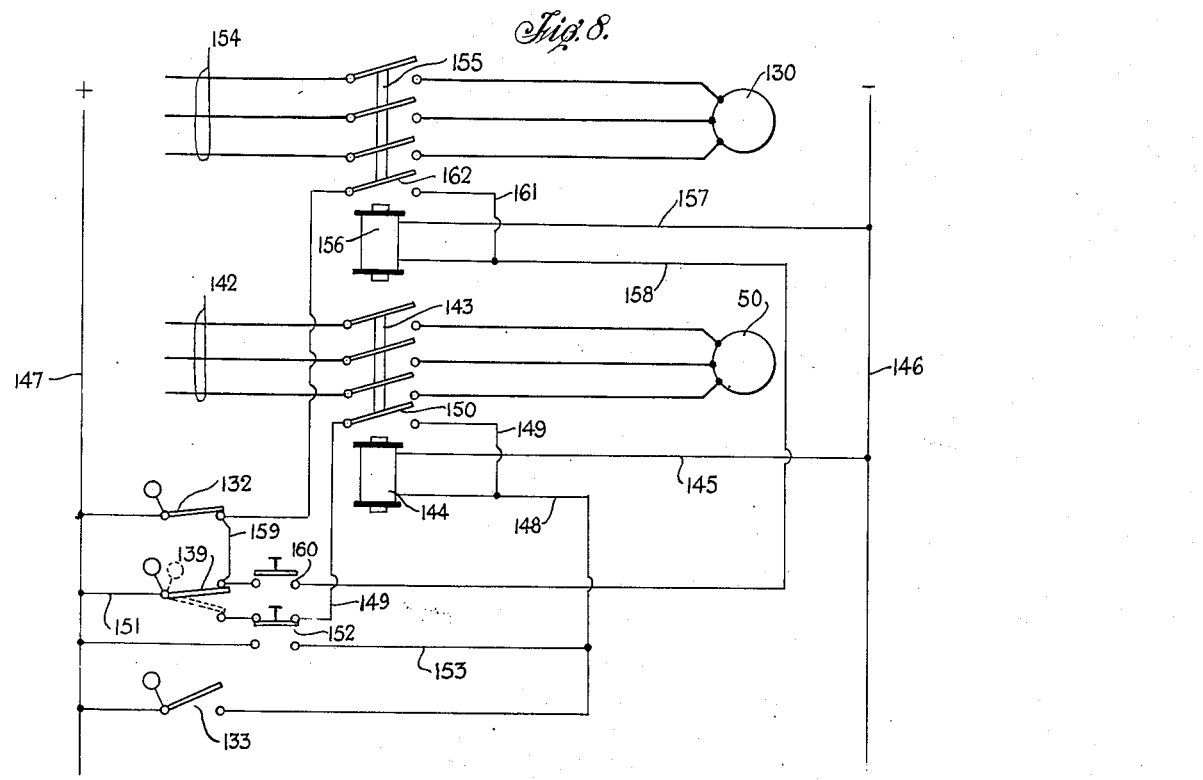
Inventors
RAYMOND W. ALLEN
AND
SIGURD V. CARLSTEN
By Ely & Frye
Attorneys Patented July 20, 1943

2,325,002

UNITED STATES PATENT OFFICE 2,325,002

BAND CUTTER

Raymond W. Allen and Sigurd V. Carlsten, Akron, Ohio, assignors to The Firestone Tire & Rubber Company, Akron, Ohio, a corporation of Ohio Application December 11, 1942, Serial No. 468,866

5 Claims. (Cl. 164—69)

This invention relates to band cutters, and more especially it relates to apparatus for accurately and automatically severing a succession of bands of relatively narrow width from a fabricated tubular band or sleeve of relatively long length. The invention is of primary utility for severing fan belt blanks from a sleeve of fan belt material while the same is still upon the collapsible form or drum upon which it is fabricated.

In the manufacture of small transmission belts, such as fan belts, it is common practice to build upon a collapsible cylindrical form a sleeve composed of unvulcanized rubber or rubber-like material and circumferentially laid cords or strands, then to sever the sleeve transversely into a plurality of individual units, and thereafter to vulcanize said units in individual molds. It has been found that superior belts are produced if cord reinforcing in the sleeve is continuous, and laid in laterally abutting convolutions for each belt with an appreciable space between the groups of convolutions of adjacent belts, which space the reinforcing cord crosses at relatively steep pitch. In the subsequent severing of the sleeve it is essential that the cuts be made accurately, half way between each group of convolutions, so that in the finished belts the reinforcing strands will be centrally positioned with relation to the sides of the belts. The present invention is an improvement in apparatus for cutting belt-bands of this type.

The chief objects of the invention are to provide cutting apparatus for the purpose mentioned, which apparatus will sever bands from a sleeve of belt material accurately and automatically in succession; to provide for accurately indexing the cutter, axially of the sleeve of material, after each cutting operation; and to provide means for integrating the operative movement of the cutter and the operation of the cutter-indexing mechanism so that they operate in determinate time-relation. Other objects will be manifest as the description proceeds.

Of the accompanying drawings:

Fig. 1 is a front elevation of apparatus for fabricating and severing a sleeve of fan belt material, power driving means for the apparatus, located at the left thereof, being omitted;

Fig. 7 is a section on the line 7—7 of Fig. 4; and

Fig. 8 is a wiring diagram of the cutting mechanism.

Figure 3:
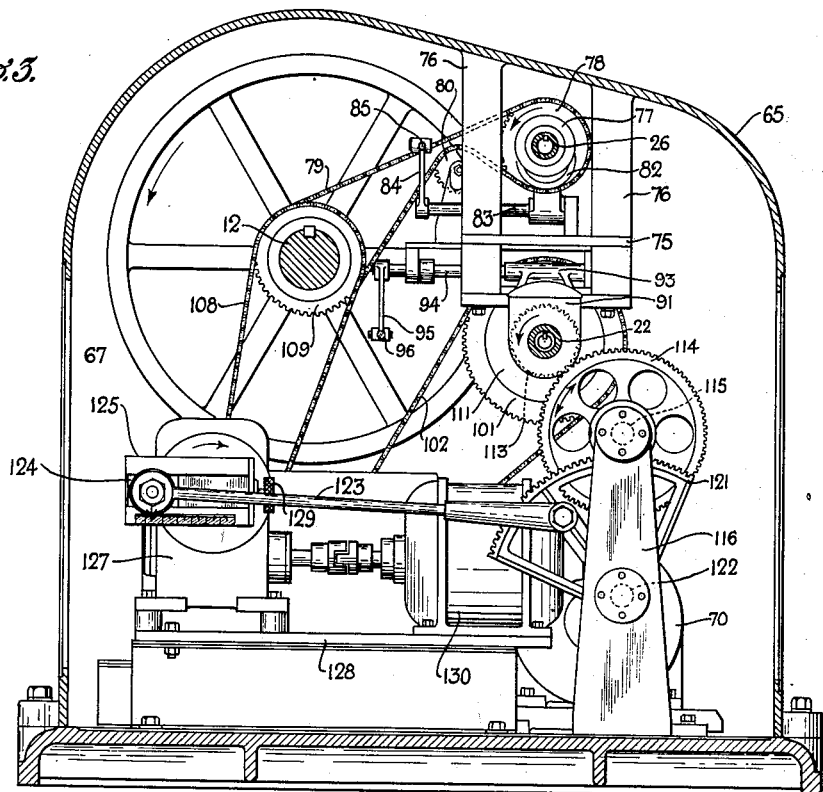
Fig. 3 is a section on the line 3—3 of Fig. 4 of the power driving means of the apparatus.

Referring to the drawings, there is shown an apparatus comprising a foundation or base structure 10 having mounted thereon, at the front thereof, a pair of upright supports, such as the support 11, in which a driven shaft 12 is journaled, which shaft is adapted to support a collapsible form or drum 13 upon which the various plies of fan belt stock may be wound. Means subsequently to be described is provided for driving the shaft 12 at determinate speed in the direction indicated by the arrow in Fig. 2. One of the supports 11, at least, is slidably mounted upon the base 10, and is capable of movement axially of the shaft 12 to facilitate the mounting of the drum 13 on the latter. Mechanism for applying reinforcing cords to the sleeve of material being built upon the drum 13, and for subsequently severing the said sleeve on the drum into individual bands or fan belt units, is carried upon a table 14 that is positioned upon the top of the base 10, rearwardly of the supports 11. The table 14 is mounted in suitable slideways 15, 15 and is adjustable in a fore-and-aft direction to move it toward or away from the drum 13. This adapts the apparatus to operation upon drums of various diameters whereby belts of different sizes may be produced.

At each end the table 14 is formed with upstanding bearing structures 18, 18, and between said bearing structures a slide 19 is mounted in slideways 20, 20 on said table, the slideways enabling the slide 19 to move longitudinally of the table, back and forth between said bearing structures 18. The slide 19 has the general shape of an inverted U, and for moving the same laterally along slideway 20 a feed screw 21 is provided, said feed screw being threaded through the respective legs of the slide at the bottom thereof. The feed screw 21 is journaled at its respective ends in the bearing structures 18, and at the left end of the apparatus is connected to a power-driven member 22 by means of a universal joint 23. The feed screw 21 is driven at determinate speed with relation to the shaft 12 of the form 13 so that reinforcing cord may be guided properly onto the form, the relative speed being variable so that the number of convolutions in each group of convolutions may be varied.

The mechanism for guiding a reinforcing cord onto the form 13 comprises a driven shaft 25 that is journaled at its ends in the bearing structures 18, and at one end is connected to a drive member 26 through the agency of a universal coupling 27. Between the bearing structures 18 the shaft 25 extends through the respective vertical legs of the U-shaped slide 19, and carries a bushing 28, which bushing is journaled at its ends in the respective legs of the slide 19. The shaft 25 is formed with a keyway 29 that extends from end to end thereof, and a key 30, Figure 2, engaged in said keyway provides driving connection between said shaft and bushing, the arrangement being such that the bushing will be rotated by the shaft at all times as the slide 19 is moved longitudinally of the table 14 by the feed screw 21. The upper part of slide 19 comprises a horizontal portion 19a upon the front of which is formed a horizontal slideway 31 in which a slide 32 is mounted, the latter locally embracing the bushing 28 substantially in the medial region thereof. The slide 32 has a bracket 33 of gooseneck shape that constitutes a cord guide mounted thereon, said cord guide extending forwardly and downwardly therefrom. The cord guide 33 has a pair of guide sheaves 34, 35 journaled thereon for guiding reinforcing cord, from any convenient source of supply, to the form 13.

The bushing 28 is free to rotate relatively of the slide 32, and said slide is capable of limited movement axially of the bushing. Such axial movement of the slide 32 is utilized for so guiding a reinforcing cord to the form 13 as to lay the cord thereon in spaced apart sets or groups of laterally abutting convolutions. To this end means is provided for effecting axial movement of the slide 32 at determinate intervals. More specifically, the slide 32 is moved slowly to the left, as viewed in Fig. 1 of the drawings, and then quickly returned to point of starting once during each revolution of the shaft 25. The means employed for effecting such axial movement of the slide 32 comprises an annular face cam 37 that is fixedly attached to one side of said slide, concentrically of the bushing 28. The cam surface of the cam 37 is on the end face thereof that is remote from the slide 32, said cam surface defining a helix about the bushing 28, the ends of the helix being connected by a flat face or shoulder that is parallel to the axis of the cam. Cooperating with cam element 37 is a cylindrical cam element 40 that is mounted upon the bushing 28 and fixedly secured thereto, said cam element having an end formed with a cam surface complemental to the cam surface of the cam 37, and cooperating therewith. A compression spring 41 is mounted upon the bushing 28, between a lateral wall of the slide 19 and the slide 32, on the side of the latter remote from the cams 37, 40, the arrangement being such as to urge the cam surfaces of said cams into engagement with each other at all times. The cord-laying mechanism of the apparatus is not a part of the present invention, and therefore it is not believed necessary to provide a more specific description of its construction.

As previously stated, the feed screw 21 is driven at determinate speed with relation to the rotary speed of the shaft 12 so as to feed the slide 19, to the right, as viewed in Fig. 1. The shaft 25 also is driven at differential speed with relation to the speed of shaft 12 and feed screw 21. The bushing 28, slide 32, and cord guide 33 are all moved along shaft 25 by reason of the lateral movement of the slide 19 induced by feed screw 21, but since the slide 32 and cam element 37 do not rotate with shaft 25, it will be apparent that rotation of bushing 28 will rotate cam element 40 relatively of cam element 37. Since the cam element 40 is fixed on bushing 28, it follows that rotation of shaft 25 in the direction of the arrow in Fig. 1 will cause the cam 40 to force the cam 37 away from it, and thus cause the latter and slide 32 to move axially of bushing 28, toward the left as viewed in Fig. 1, against the force of the spring 41. Such movement of the slide 32 relatively of the slide 19 continues until the shaft 25 has made one complete revolution, at which time the axially extending shoulders on the cams 37, 40 come into registry, whereupon the spring 41 is enabled to expand and quickly move the slide 32 to the right, back to point of starting.

From the foregoing it will be apparent that the cord guide 33 will move to the right, during the winding of reinforcing cord onto the drum 13, during relatively long intervals at uniform speed, which intervals are interrupted by relatively short or instantaneous intervals of much greater speed. Furthermore it will be apparent that the movement of the cord guide 33 at uniform speed is the result of the speed of movement of the slide 19 in one direction and the slower speed of movement of the slide 32 relatively of slide 19, in the opposite direction. Moreover, the rotary speed of the feed screw 21 is so co-related to the speed of rotation of the shaft 12 that the cord guide 33, moving laterally at its resultant uniform speed, will lay a reinforcing cord upon the form 13 in a plurality or set of laterally abutting convolutions. When the cord guide is moved laterally quickly under the impetus of the spring 41, it so lays the cord on the form as to produce the spacing between adjacent sets of laterally abutting convolutions. By varying the speed of the shaft 25 with relation to the rotary speed of the feed screw 21 the length of the intervals of uniform movement of the cord guide 33 may be controlled, with resultant control of the number of convolutions of reinforcing cord in each set or group of laterally abutting convolutions.

Figure 5:
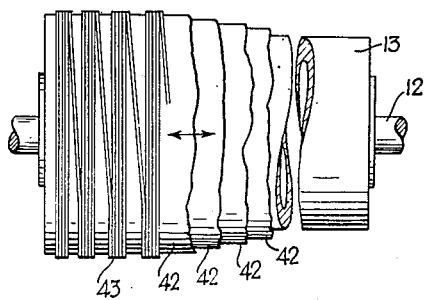
Fig. 5 is a fragmentary elevation of the winding drum or form of the apparatus, and work thereon, a portion of the latter being broken away.
Figure 6:
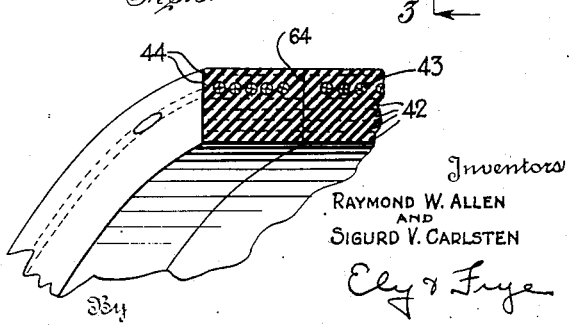
Fig. 6 is a fragmentary sectional perspective view of the sleeve of belt material as it is produced by the apparatus.

The slide 19 moves to the right, as previously explained, during the application of reinforcing cord to the structure being built upon form 13. After the reinforcing cord is applied to the form from one end thereof to the other, the feed screw 21 may be reversed and the slide 19 impelled thereby back to point of starting if the operations described are to be repeated to apply additional layers of reinforcing cords to the form. After the reinforcing cord is mounted on the band material on the form, an additional layer or layers of the band stock are applied to the form to cover the cords. The table 14 and all the mechanism thereon may be moved rearwardly, away from the form 13, to facilitate the application of additional band stock to the form. In Figure 5 the form 13 is shown with four layers or plies of band material 42 beneath the single layer of reinforcing cords, the latter designated 43. In Figure 6 two layers of the band material are shown superposed upon the layer of cords. As soon as all the plies of material are mounted on the form, the fabricated sleeve of material is ready to be severed into individual band or belt units, the sleeve being circumferentially cut between adjacent groups of reinforcing cords therein, as is clearly shown in Figure 6.

Such cutting is achieved mechanically and automatically by cutting mechanism which comprises a rock shaft 45 that is positioned between the feed screw 21 and shaft 25 parallel to both of them, said rock shaft being journaled at its ends in the bearing structures 18. At one end of the rock shaft 45 a rearwardly extending rocker arm 46 is mounted thereon, the free end of said rocker arm having one end of a link or pitman 47 pivotally connected thereto, the other end of said link being pivotally connected to a rotary disc or crank 48, eccentrically of the axis thereof, the arrangement being such as to effect the rocking of the shaft 45 as the disc 48 is rotated. The disc 48 is mounted on the driven shaft of a reduction gear device 49 that is carried by the frame of an electrical motor 50 and is driven thereby, said motor being mounted upon the table 14 at the rear thereof.

The rock shaft 45 extends through suitable apertures in the lateral walls of the slide 19, and is formed with a keyway 52 extending from end to end thereof. Mounted upon the rock shaft 45, between the lateral walls of the slide 19, is a bracket 53 that is keyed to the rock shaft but is capable of movement longitudinally thereof by reason of the elongated keyway 52. Spacer sleeves 54, 54 slidably mounted upon the rock shaft and keyed thereto restrain the bracket 53 against axial movement relatively of the slide 19, yet enable the bracket to move angularly relatively of said slide when the rock shaft is rocked. Formed integral with the bracket 53 and extending forwardly thereof is a journal bearing 53a that carries a shaft 55, one end of the latter carrying a disc cutter 56 and the other end thereof carrying a grooved driving pulley 57. Also carried by the bracket 53, rearwardly of the shaft 45, is a supporting structure 63 for an electric motor 58, the shaft of the latter carrying a grooved driving pulley (not shown) that has driving connection with the pulley 57 through the agency of a pair of transmission belts 60. The support 63 with motor 58 thereon is adjustable relatively of bracket 53 so as to maintain the belts 60 in taut condition. Normally the motor 58 is constantly driven. The motor 50 is intermittently driven, and during each operative cycle serves to swing the cutter 56 from the position shown in broken lines in Fig. 2 to the position shown in full lines thereon, and back to point of starting.

The cutting mechanism described is idle during the fabrication of a sleeve of material upon the form 13. After the sleeve of material is completely formed, the slide 19 is at the right end of the apparatus as viewed in Fig. 1. Thereafter the cutting mechanism may be brought into operation to effect intermittent, reverse rotation of the feed screw 21 to move the slide 19 toward the left a distance equal to the width of one band or belt unit, and intermittently to drive the motor 50 at intervals when the slide 19 is stationary, it being understood that the motor 58 is constantly rotating during the cutting operation. The driving of motor 50 rotates disc 48, and with each revolution thereof the rock shaft 45 is rocked and the rotating cutter 56 is raised from a depressed inoperative position (shown in broken lines in Fig. 2) to the operative position shown in full lines, then returned to point of starting. In its operative position the cutter 56 is in engagement with the sleeve of belt material on the form 13 and said operative position is maintained while the form rotates to effect a complete circumferential severing of the belt material on the form, as indicated by line of severence 64, Fig. 6. The slide 19 is indexed laterally, the distance of one belt unit, during the time that the cutter 56 is in its inoperative position. The cutting operation described is automatically repeated until the entire sleeve of material on the form 13 is transversely cut into a multiplicity of band units. The cutting of the sleeve of material is facilitated by liquid lubricant applied to the cutting disc 56 by means of a nozzle 61 on the end of a supply hose 62 that has connection with a reservoir of lubricant (not shown).

Figure 4:
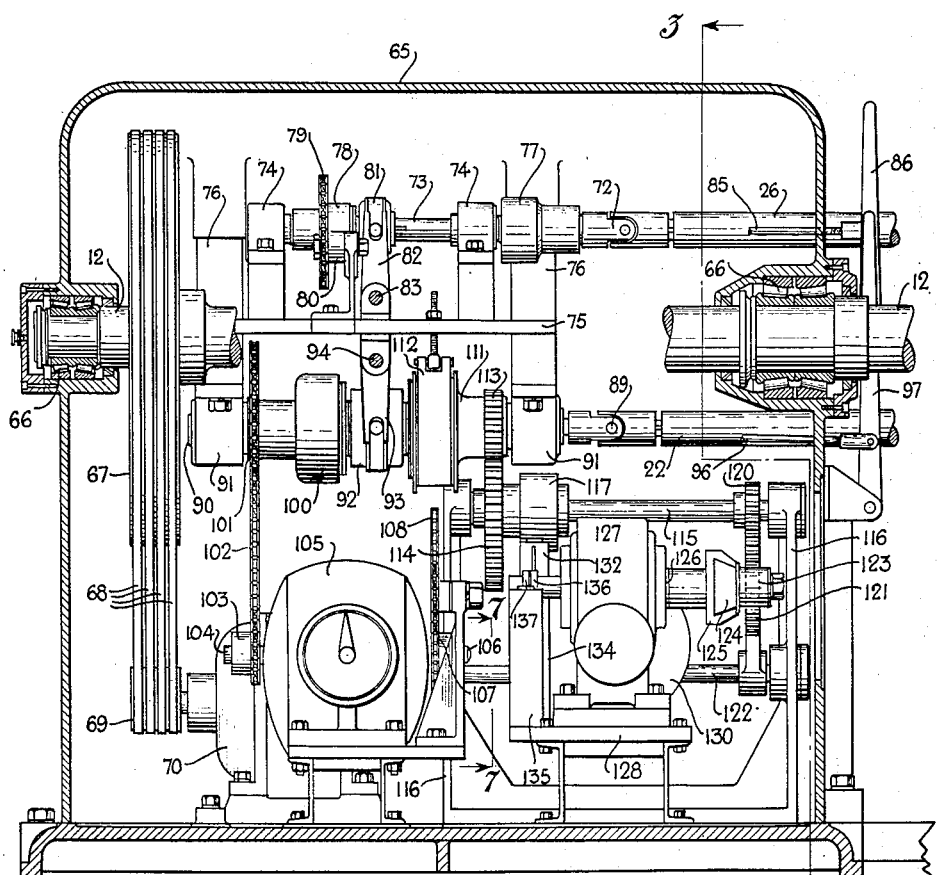
Fig. 4 is a front elevation of the power driving means of the apparatus, parts being broken away and in section.

The power mechanism that drives the shaft 12, the feed screw 21, and the shaft 25 in the proper directions and at the desired relative speeds to effect the fabrication of the sleeve of material on the form 13, is contained in a housing 65 that is located at the left of the apparatus shown in Fig. 1, details of said housing and power mechanism being shown in Figs. 3, 4, and 7. Also located in said housing is the mechanism for rotating the feed screw 21 intermittently, and in reverse from the direction that it rotates during a sleeve-fabricating operation.

As shown in Fig. 4, the shaft 12 that supports and rotates the form 13 extends completely through the housing 65 and is journaled in bearings 66, 66 carried by opposite walls of the housing. The medial portion of the shaft is broken away in the drawing to reveal structure behind the shaft. On the end portion of the shaft 12, shown at the left in the drawings, is mounted a relatively large driving pulley 67, the perimeter of which is grooved to receive a plurality of side-driving transmission belts 68, 68. The latter also are trained about a relatively small driving pulley 69 on the shaft of a reversible motor 70, the arrangement being such that the latter drives shaft 12 to effect rotation of the form 13, the direction of rotation being indicated by the arrow, Fig. 3.

As previously stated, the shaft 25 is connected by a universal joint 27 to a drive member 26. The latter is a two part slip-shaft that is connected by a universal joint 72, and an overrunning clutch 77 to a horizontal driven countershaft 73. The countershaft 73 is journaled in a pair of bearing brackets 74, 74 that are mounted upon a shelf or suspended platform 75, said shelf being supported by depending formations 76 that are integral with the top wall of the housing 65. The countershaft 73 is arranged to be driven by the motor 70 in the same direction as the shaft 12, and to this end a sprocket 78 is journaled on the countershaft 73. A sprocket chain 79 is trained about the sprocket 78 and about a sprocket (not shown) that is mounted upon the shaft 12, an adjustable idler sprocket 80 being provided to maintain the chain 79 in taut condition. For effecting driving connection between the sprocket 78 and the shaft 73, a manually operable clutch 81 is provided, said clutch being keyed to the shaft 73 and being shiftable into driving engagement with said sprocket. Engaging the clutch 81 is a shipper lever 82 carried by a suitably journaled rock shaft 83 that has a rocker arm 84 mounted upon one end thereof, the free end of said rocker arm being pivotally connected to an end of an operating rod 85 that extends horizontally through a wall of the housing 65 and is pivotally connected to a manually operable lever 86 mounted upon the exterior of the housing, and conveniently accessible to the operator of the apparatus. The arrangement is such as to enable the shaft 25 to be disengaged from its driving means when desired, as when the drive of the motor 70 is reversed to return the slide 19 from the right end of the apparatus to the left end thereof. The over-running clutch 77 is a safety feature preventing the shaft 25 from being turned backward, such as might occur if the clutch 81 was engaged, the motor 70 was idle, and the drum 13 was moved in the direction that is reverse to its normal direction of rotation, or if the motor 70 was reversed while the clutch 81 was engaged. The slip shaft 26 is necessary to provide driving connection to the shaft 25 in all positions of fore and aft adjustment of the table 14.

As shown in the drawings, the countershaft 73 is driven at the same speed as the shaft 12. It is required however, that the form 13 be rotated a determinate number of times faster than the shaft 25 in order that a determinate number of laterally abutting convolutions of cord be wound about the sleeve of material on the form between intervals when the cord guide 33 is moved laterally quickly to provide the spacing between successive groups of convolutions, such movement of the cord guide occurring once with each revolution of the shaft 25. Accordingly, suitable change speed gearing is interposed in the mechanism that drives shaft 25, said gearing being located in a bearing structure 18, Fig. 1, between the shaft 25 and the universal joint 27. Since this change speed gearing is not a part of the present invention, it is believed that detail illustration and description thereof will not be required.

As previously stated, the feed screw 21 requires to be driven at determinate speed with relation to the rotation of shaft 12 so as properly to control the position of the respective convolutions of cord in each group of convolutions thereof laid upon the sleeve of material on form 13. Furthermore the screw 21 requires to be rotated intermittently in reverse direction during the sleeve cutting operation. Referring now to Fig. 4, it will be seen that the power driven member 22 that drives screw 21 is a two part slip-shaft that extends through the wall of housing 65, and interiorly of the latter is connected by universal joint 89 to a horizontal shaft 90 disposed below and parallel to the shaft 73. The shaft 90 is journaled in bearing brackets 91, 91 that are mounted upon the under side of the shelf 75. Slidably keyed to the shaft 90, midway between brackets 91, is a double clutch member 92, and engaged therewith is a shipper lever 93 for shifting it axially to alternative positions on the shaft. The shipper lever 93 is mounted on a suitably journaled rock shaft 94, a projecting end portion of which carries a rocker arm 95 that has its free end pivotally connected to an operating rod 96. The latter extends through a wall of the housing 65 and is pivotally connected to a manually operable lever 97 mounted upon the exterior of said housing, near the lever 86 previously described.

Journaled upon the shaft 90, at one side of the clutch member 92, is a driving cup 100 with which the clutch member 92 has driving engagement in one of its operative positions. The driving cup 100 is formed with a hub portion on which is mounted a sprocket 101, and trained thereabout is a sprocket chain 102 that also is trained about a sprocket 103 on the driven shaft 104 of a positive, infinitely variable, speed reducing device 105. For driving the latter, the driving shaft 106 thereof is provided with a sprocket 107, and trained about the latter is a sprocket chain 108 that also is trained about a sprocket 109, Fig. 3, that is carried by the shaft 12. The arrangement is such that the motor 70 may drive the feed screw 21 in either direction to move the slide 19 back and forth along the apparatus during the application of cord reinforcement to a sleeve of material on the form 13, the speed of movement of the slide being accurately adjustable independently of the rotary speed of the form.

Journaled upon the shaft 90, on the opposite side of the clutch member 92 from the driving cup 100, is a second driving cup 111 with which the said clutch member is operatively engageable in its alternative operative position. The perimeter of the driving cup 111 is formed as brake drum, and engaged therewith is a brake band 112 that is anchored to the shelf 75 thereabove. The arrangement is such that the shaft 90 will not coast when driving torque applied thereto through the agency of the driving cup 111, as presently will be explained, is discontinued. The driving cup 111 is formed with a hub portion on which is mounted a gear 113, and meshed with the latter is a larger gear 114 that is carried upon a countershaft 115 that is journaled at its ends in a pair of upright bracket arms 116, 116 that are mounted upon the base of the housing. The gear 114 has driving connection with the countershaft 115 through the agency of an overrunning clutch 117 that is mounted on said countershaft, said clutch having driving connection with said gear only when the countershaft rotates in one direction, the gear remaining stationary when the countershaft rotates in the opposite direction. The arrangement is such that the countershaft 115, driving through gears 114, 113, and clutch 92, will rotate the feed screw 21, the overrunning clutch 117 being so arranged that the countershaft can drive said feed screw in the direction that moves the slide 19 from right to left as viewed in Fig. 1. The clutch 117 is constructed to operate with extreme precision, without back lash or lost motion, it being essential that the rotation of the feed screw be controlled to a nicety during the band-cutting operation for reasons that presently will appear.

The countershaft 115 is arranged to be oscillated, and to this end has a pinion 120 mounted on the end portion thereof remote from the gear 114, said pinion being in mesh with a gear segment 121 that is mounted upon a shaft 122, the latter being journaled at its ends in the bracket arms 116. Pivotally connected at one end to the gear segment 121 is a pitman 123, the other end of which is pivotally connected to a slide 124 carried by a crank 125 that is mounted on a crank shaft 126 that projects from a speed-reducing device 127 that is mounted upon a platform 128 in the bottom of the housing 65. The slide 124 is adjustable on the crank, radially of the crank shaft 126, by means of an adjusting screw 129, whereby the angular movement or oscillation of the gear segment may be controlled to a nicety. A motor 130 is mounted upon the platform 128 and is coupled to the speed-reducing device 127 for driving the latter, said motor normally being continuously driven, but automatically momentarily stopping, upon occasion, as presently will be explained. The arrangement is such that the motor 130 oscillates the shaft 115, and the latter, driving through the overrunning clutch 117 and gear 114, drives the shaft 90 and the feed screw 21 connected thereto, intermittently and only in one direction. Such intermittent driving of the feed screw moves the slide 19 laterally a determinate distance, toward the left as viewed in Fig. 1, to position the cutter 56 thereon accurately so that it may sever the sleeve of material on the form 13 exactly midway between adjacent groups of cord convolutions therein.

Figure 2:
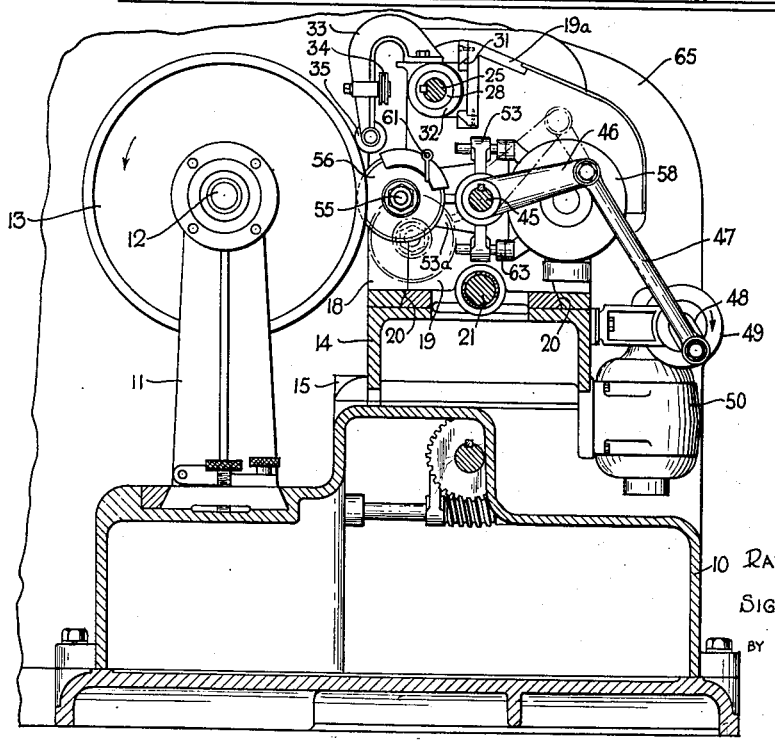
Fig. 2 is a section on the line 2—2 of Fig. 1.

It will be obvious that during the band-cutting operation, the periodic movements of the slide 19 must occur while the cutter 56 is in the inoperative position shown in broken lines in Fig. 2. To this end electrical means is provided for coordinating the driving of the motor 50 with the means that imparts periodic lateral movement to the slide 19, including means for momentarily stopping the drive of motor 130 if the cutter 55 is not properly positioned when the slide moving means is in a determinate operative position. Said electrical means comprises a normally closed limit switch 132 and a normally open limit switch 133, said limit switches being mounted upon respective supporting brackets 134, 135 that are supported upon the platform 128 on the opposite side of the speed-reducing device 127 from the crank 125 of the latter. Said switches also are positioned on opposite sides of a projecting end portion of crank shaft 126, as best shown in Fig. 7, and are engageable by respective identical cams 136, 137 mounted beside each other on said crank shaft, and so angularly positioned thereon as to operate switches 132, 133 at determinate intervals during each rotation thereof. A third limit switch, designated 139, is mounted upon the frame of the slide 19, and is engageable by a cam or operating element 140 that is fixed upon one of the spacer sleeves 54 on the rock shaft 45, the cam 140 being so angularly positioned that it operates the switch 139 only when the rock shaft has moved the cutter 56 to the inoperative position shown in broken lines in Fig. 1. The limit switch 139 is a double throw switch, that is, the operation thereof breaks one contact and makes another.

The function and operation of said limit switches will be apparent upon reference to the wiring diagram of the cutter control shown in Fig. 8. As shown in said drawings, the motor 50 has a power circuit comprising conductors 142, and a three-contact switch 143 is located in the latter to control operation of said motor, said switch being a part of and operated by a relay 144. The relay 144 has an operating circuit comprising a conductor 145 that is connected to conductor 146 that is one of the main leads of the cutter control circuit, the other main lead of which is conductor 147. The operating circuit of relay 144 also comprises conductor 148 that is connected to conductor 147, the limit switch 133 being located in conductor 148 and controlling the operation of this relay circuit. The relay 144 is provided with a holding circuit 149 connecting conductor 148 to main control lead 147 through a switch member 150 that is associated with switch 143 and is operated by relay 144, said conductor extending to one of the alternatively closable contacts of limit switch 139, the latter being connected to main lead 147 by conductor 151. Between switch 150 and 139 the holding circuit includes a normally closed, manually operable stop switch 152. The switch 152 is a make and break switch, and includes normally open switch contacts disposed in a shunt circuit 153 that connects conductor 148 to main lead 147 in a manner that shunts out limit switch 133. Thus the switch 152 may be utilized to de-energize relay 144 and stop motor 50 when limit switch 139 is in the position shown in broken lines in Fig. 8, or it may be used to momentarily energize the relay 144 to start or "jog" the motor 50 when the switch 139 is in the position shown in full lines in the drawings.

The motor 130 has a power circuit comprising conductors 154, and a three-contact switch 155 is located in the latter to control operation of the motor, said switch being a part of and operated by a relay 156. The relay 156 has an operating circuit comprising a conductor 157 that is connected to main lead 146, and a conductor 158 that is connectable to the other main lead 147 through the agency of the other alternative contact of the limit switch 139. The latter contact is connected to the openable and closable contact of limit switch 132 by conductor 159, the arrangement being such that the switches 132, 139 are in parallel in the holding circuit of the relay 156. Mounted across conductor 158 is a normally open, manually operable switch 160 that may be used, on occasion when the switch 139 is in the position shown in broken lines, to "jog" or momentarily energize the motor 130. The relay 156 is provided with a holding circuit 161 connecting conductor 158 to the main control lead 147 through a switch member 162 that is associated with switch 155 and is operated by relay 156, said circuit 161 also including the normally closed limit switch 132.

The operation of the cutter control is as follows. Assume that the motor 50 is stopped and the cutter 56 is in the inoperative position shown in broken lines in Fig. 2. Assume that motor 130 has completed the operation of turning the feed screw 21 a determinate distance to feed the slide 19 laterally, toward the left as viewed in Fig. 1, and that the cutter 56 is properly positioned to sever the sleeve of material on form 13, the latter being rotated by the constantly driven motor 70. Rotation of shaft 126 first causes cam 137 to engage and close limit switch 133 thereby energizing relay 144 through the agency of conductors 148, 145, with the result that relay 144 closes switch 143 in the power circuit of motor 50, to start the latter, and also closes switch 150 in its own holding circuit 149. As the motor 50 starts rotating to turn the rock shaft, the cam 140 on the latter moves limit switch 139 from the position shown in full lines in Fig. 8 to the position shown in broken lines therein, thereby completing the holding circuit of the relay 144. Driving of motor 50 swings the cutter into the position shown in full lines in Fig. 2, to sever the material on the rotating sleeve 13, and then returns the cutter to its broken line position of Fig. 2, the cam 140 restoring the limit switch 139 to the position shown in full lines in Fig. 8 as the return movement of the cutter is completed. Since switch 133 previously was opened by continued rotation of the shaft 126, the reversing of switch 139 de-energizes relay 144 and thus opens switch 143 to stop the motor 50.

While the cutter 56 is engaged with the work the slide 19 and feed screw are stationary because of reverse movement of shaft 115. The shaft 126, however, continues to drive, and immediately before the shaft 115 again is reversed, to index the slide 19 laterally, cam 136 engages and momentarily opens limit switch 132. If the cutter 56 at this time is in its inoperative position shown in broken lines in Fig. 2, the limit switch 139 will be in the position shown in full lines in Fig. 8, and opening of switch 132 will produce no result. If, however, the cutter is not in the inoperative position mentioned, the switch 139 will be in the position shown in broken lines in Fig. 8, so that opening of switch 132 will de-energize relay 156 and stop motor 130. The arrangement constitutes a safety feature whereby it is impossible to index the slide 19 laterally while the cutter 56 is in engagement with the work. Thereafter relay 156 will be energized again to start motor 130 as soon as the drive of motor 50 effects the moving of switch 139 to the full line position shown in Fig. 8, the circuit of relay 156 then being completed through conductor 159. Such movement of switch 139 also opens the circuit to relay 144 and stops motor 50, thus completing a cycle of operation.

From the foregoing it will be seen that the operations of the cutter motor 50 and the slide-indexing motor 130 are co-ordinated automatically, without requiring precision control of the speed of rotation of either motor. It will also be apparent that the means provided will effect the indexing of the slide 19 with such precision that the severing of the sleeve of material on form 13 always will take place at the proper point, midway between groups of reinforcing cords in said sleeve.

Modification may be resorted to without departing from the spirit of the invention, or the scope thereof as defined by the appended claims.

We claim:

1. In a band cutter of the character described, the combination of a rotatable form upon which a sleeve of material may be fabricated, a slide beside said form and movable parallel to the axis thereof, a constantly rotating circular cutter carried by said slide, means including a normally constantly driven motor for periodically moving said slide laterally a determinate distance axially of said form, means including a periodically driven motor for moving said cutter periodically into and out of cutting engagement with the material on said form during periods when the slide is stationary, and means for stopping the constantly driven motor immediately prior to the slide-moving operation if the cutter is not in determinate inoperative position.

2. A combination as defined in claim 2 including a relay controlling the operation of the slide-moving motor, the last-mentioned means comprising a pair of switches arranged in parallel in the holding circuit of said relay, one of said switches being operable by the slide-moving means and the other switch being operable by the cutter-moving means.

3. In a band cutter of the character described, the combination of a rotatable form upon which a sleeve of material may be fabricated, a slide beside said form and movable parallel to the axis of the latter, a cutter carried by said slide, a normally constantly driven motor, mechanical means converting the constant motor drive into intermittent movement impelling the slide laterally a determinate distance axially of said form, a periodically driven motor moving the cutter relatively of the slide into cutting engagement with the sleeve of material on the form, and switch means, operated by the mechanical means that intermittently move said slide, for starting the periodically driven motor to initiate a cutting operation.

4. A combination as defined in claim 3 including switch means controlled by the cutting mechanism for stopping the operation of the periodically driven motor.

5. A combination as defined in claim 3 including switch means, operated by the mechanical means that intermittently move the slide, for stopping the constantly driven motor immediately prior to movement of the slide if the cutter is not in determinate inoperative position.

RAYMOND W. ALLEN.
SIGURD V. CARLSTEN.

CERTIFICATE OF CORRECTION.

Patent No. 2,325,002. July 20, 1943.

RAYMOND W. ALLEN, ET AL.

It is hereby certified that error appears in the printed specification of the above numbered patent requiring correction as follows: Page 6, second column, line 9, for "claim 2" read --claim 1--; and that the said Letters Patent should be read with this correction therein that the same may conform to the record of the case in the Patent Office.

Signed and sealed this 9th day of November, A. D. 1943.

(Seal)

Henry Van Arsdale,
Acting Commissioner of Patents.